United States Patent [19]
Erath et al.

[11] Patent Number: 6,088,299
[45] Date of Patent: Jul. 11, 2000

[54] VERTICAL HYDROPHONE ARRAY

[75] Inventors: Louis W. Erath, Abbeville, La.; Phillip Sam Bull, Houston, Tex.

[73] Assignee: Syntron, Inc., Houston, Tex.

[21] Appl. No.: 09/205,595

[22] Filed: Dec. 4, 1998

[51] Int. Cl.[7] .................................................. G01S 3/80
[52] U.S. Cl. ............................ 367/154; 367/123; 367/20
[58] Field of Search ................................ 367/15, 20, 103, 367/123, 153, 154

[56] References Cited

U.S. PATENT DOCUMENTS

| | | | |
|---|---|---|---|
| 4,173,007 | 10/1979 | McKeighen et al. | 367/123 |
| 4,254,480 | 3/1981 | French | 367/58 |
| 4,272,835 | 6/1981 | Flood et al. | 367/4 |
| 4,423,494 | 12/1983 | Groves et al. | 367/123 |
| 4,494,938 | 1/1985 | Flood et al. | 441/33 |
| 4,638,468 | 1/1987 | Francis | 367/153 |
| 4,694,435 | 9/1987 | Magneville | 367/17 |
| 4,901,287 | 2/1990 | Hathaway et al. | 367/3 |
| 4,958,328 | 9/1990 | Stubblefield | 367/15 |
| 4,970,697 | 11/1990 | Earley et al. | 367/15 |
| 5,091,892 | 2/1992 | Secretan | 367/153 |
| 5,113,377 | 5/1992 | Johnson | 367/20 |
| 5,117,396 | 5/1992 | Castile et al. | 367/3 |
| 5,257,243 | 10/1993 | DeChico et al. | 367/169 |
| 5,317,383 | 5/1994 | Berni | 356/351 |
| 5,327,216 | 7/1994 | Berni | 356/351 |
| 5,452,266 | 9/1995 | Carter | 367/153 |
| 5,535,176 | 7/1996 | Yang | 367/13 |

OTHER PUBLICATIONS

1998 AAPG Annual Convention Abstract, May 17–28, 1998, "Strathspey Vertical–Cable Seismic Survey: A North Sea First", by Patrick Leach.

*Primary Examiner*—Ian J. Lobo
*Attorney, Agent, or Firm*—Felsman, Bradley, Vaden, Gunter & Dillon, LLP

[57] ABSTRACT

A vertical hydrophone cable includes a support cable, a plurality of hydrophones, and an equal number of delay elements which are tuned to provide synchronization between the seismic and electrical signals. A number of such vertical hydrophone cables are provided. In operation, the vertical array provides a method of seismic exploration comprising the steps of deploying the plurality of vertical hydrophone cables with the integral delay elements, generating a seismic signal, and receiving reflected return signals at the plurality of hydrophones with synchronism between the electrical and sound signals, so that the vertical cable functions in the manner of a traveling wave antenna.

19 Claims, 5 Drawing Sheets

VERTICAL HYDROPHONE ARRAY

FIELD OF THE INVENTION

The present invention relates generally to the field of seismic exploration and, more particularly, to a vertical hydrophone array used in marine seismic exploration and a method of receiving a marine seismic signal.

BACKGROUND OF THE INVENTION

Recent developments have shown the efficacy and advantages of vertical-cable seismic survey systems. Such systems have proven particularly useful in surveying operations which require a uniform distribution of azimuths and economical three dimensional pre-stack depth migration, as in very deep operations in the North Sea. Improved data quality has allowed a more confident interpretation of low-angle fault scarp features, as well as a more detailed structural model of reservoirs.

However, such systems utilize conventional hydrophone arrays arranged in a vertical pattern. The seismic signals presented to the plurality of hydrophones in the vertically displayed arrays are received and converted to electrical signals in the conventional manner, with allowances for the vertical rather than more standard horizontal orientation of the hydrophone arrays.

Thus, such systems remain limited in the depth for exploration that can be reliably conducted due to the attenuation of useful return signals. These system would be significantly enhanced if some manner of improving the signal/noise ratio could be found. The recognition of this limitation of known vertical-cable seismic systems provided an initial stimulus for the development of the present invention.

A known vertical hydrophone system for acquiring and processing marine seimic data includes cables which are suspended vertically in the water column with an anchor at one end, a buoy at the other, and a recording buoy at the surface. A vessel on the surface fires a pattern of shots, spaced apart by 10 to 25 meters, typically, covering the area around and between the cables. Once one swath of data is completed, the cables are moved to another location, and the process is repeated until the desired area of coverage is acquired.

Very accurate seismic data has been acquired with such a system, but the system presents certain drawbacks. Most apparent is the lost time in laying, retrieving, and relocating the anchored bouy system. Significant time would be saved if the system could acquire data without being anchored to the bottom. Another apparent drawback is the precision required to lay out the anchor system on the bottom in a predicable and repeatable pattern.

The system previously described has apparent advantage of having the vessel separated from a conventional recording streamer. However, this system includes a buoy at the surface for recording seismic data, and is therefore necessarily limited in the amount of data which can be stored at the surface buoy. This data must also be retrieved before another set of shots can be initiated.

Thus, there remains a need for a vertical hydrophone array system and method that is mobile, and does not require periodic relocation to survey additional territory. The system should be capable of directly reporting seismic data to the survey vessel, and should be capable of completing an entire marine seismic survey without periodic scheduled stops.

SUMMARY OF THE INVENTION

The present invention provides an improved signal to noise ratio in vertical-cable seismic signal by summing the return seismic signal in a plurality of vertically arrayed hydrophones as the acoustic signal travels upward along the vertical cable. Thus, this receiving hydrophone array functions in the manner of a Beverage or "traveling-wave" antenna system, described in "Memorandum on the Beverage Wave Antenna for Reception of Frequencies in the 550–1500 Kilocycle Band" by Benjamin Wolf and Adolph Anderson, and so-named for its inventor, H. H. Beverage. In such an antenna, a long wire (or pair of wires) is oriented in the direction of the source of a radio signal. The radio signal encounters an end of the antenna wire and generates a received signal at that point in the wire. As the radio signal travels alongside and inside the wire at the speed of EM radiation, the signal generated at any one spot within the wire is added to the signal already traveling along the wire, thereby providing gain in the signal.

In the present invention, however, the signal to be received is not electromagnetic radiation as in a Beverage antenna but a sound signal. Further, the signal to be received is not just in the direction along the vertical array, but essentially a two-dimensional sound signal generated by reflections from undersea formations. So, as a sound signal travels upward from the sea bottom to the bottom of the hydrophone array and thence upward along the array, the sound signal travels upward at the speed to sound through water, while the received signal travels upward through conductor portions of the array at the speed of EM radiation. The selected periodic time delay elements thus synchronize the sound and received signals to provide gain along the array. This significantly enhances the signal to noise ratio of the received signal.

In its most basic aspect, the present invention comprises a vertical hydrophone cable comprising a support cable, a plurality of hydrophones, and an equal number of delay elements which are tuned to provide synchronization between the seismic and electrical signals. In another aspect of this invention, a number of vertical hydrophone cables are provided, each of which comprises a support cable, a plurality of hydrophones, and an equal number of delay elements. The present invention also provides a method of seismic exploration comprising the steps of deploying the plurality of vertical hydrophone cables with the integral delay elements, generating a seismic signal, and receiving reflected return signals at the plurality of hydrophones in synchronism between the electrical and sound signals, so that the vertical cable functions in the manner of a traveling wave antenna.

The vertical hydrophone array of the present invention is particularly adapted for deep ocean seismic exploration due to the significantly enhanced gain of antenna array.

In yet another aspect of this invention, a vertical hydrophone array comprises a plurality of hydrophone supported on a vertical cable extending downward from a surface float. The surface float, in addition to supporting the hydrophone array, serves as a communcations junction which is in communication with a host vessel through a towing cable. This feature eliminates the need for a recording device which is an integral part of the hydrophone array. This feature also permits towing the hydrophone array between regions for a seismic survey, thus eliminating the need to stop seismic exploration operations while the anchoring system is weighed, and while the anchoring system is again put in place.

These and other features of this invention will be made apparent to those skilled in the seismic arts from a review of the following detailed description along with the accompanying drawings.

DETAILED DESCRIPTION OF A PREFERRED EMBODIMENT

Structure of the Vertical Hydrophone Array

Figure 1:
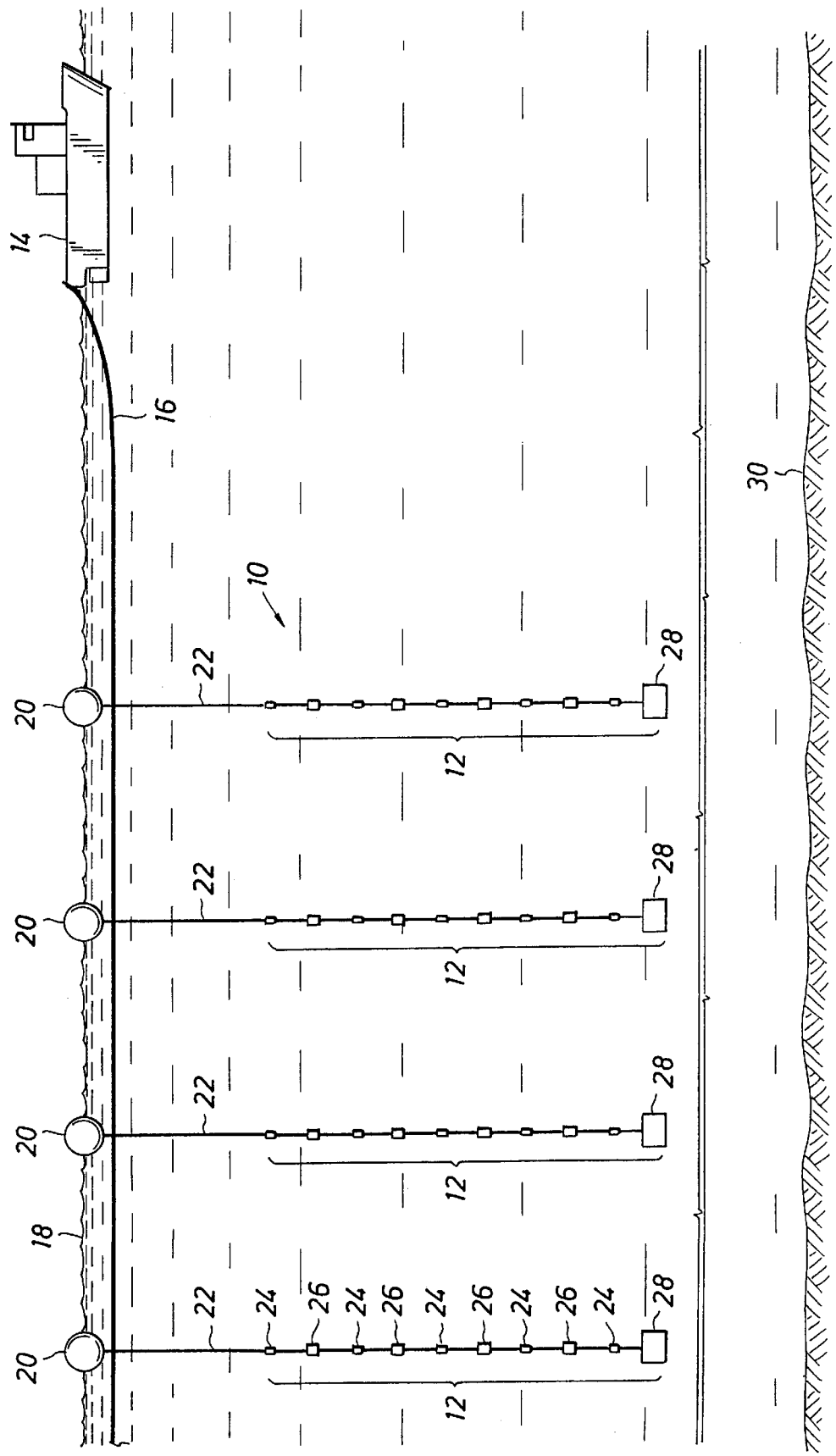
FIG. 1 is an elevation view of a vertical hydrophone array of this invention being towed behind a vessel.

FIG. 1 depicts an elevation view of a hydrophone array 10 comprising a plurality of hydrophone groups 12 being towed behind a vessel 14. In operation, the system is generally held stationary during the seismic operation, and the cable is played out behind the vessel to array the hydrophones to a predetermined display. A tow cable 16 is attached to stern of the vessel and includes electrical command and control conductors, seismic signal communications channels, stress members, and the like. The tow cable 16 is held along the surface 18 of the water by a plurality of flotation devices 20, preferably one flotation device for each hydrophone group 12.

A flotation device in the present invention also serves as a communications junction between the hydrophones and the host vessel. It receives command signals from the host vessel 14 to dynamically alter the behavior of the hydrophone array which it supports, and it may temporarily store seismic data received from its associated hydrophone array until polled by the host vessel. Alternatively, it may simply serve as the conduit for transmission of seismic data to the host vessel, if sufficient bandwidth is provided in the cable 16 for transmission of the data simultaneously with that of the other vertical arrays.

Each hydrophone group 12, suspended below a flotation device 20, comprises an antenna cable 22, a plurality of hydrophones 24, and a plurality of time delay elements 26. At the bottom end of each group is located a transducer serving as a sound signal source 28, providing a sound signal of about 50–100 Hz, for initial tuning and calibration of the hydrophone groups, since the speed of sound through water varies with such factors as temperature, salinity, depth, and so on. The sound signal source 28 is located at some distance above the ocean floor 30.

It should be noted that an untuned vertical array will present an ill-defined "cone" of receptivity, while a tuned array presents a crisply defined set of lobes.

To calibrate the system, a sound signal source 28 is actuated and a sound signal travels up to the first of the series of hydrophones 24, located lowest in the hydrophone group 12. The lowest hydrophone receives the sound signal and generates an electrical signal representative of the detected sound signal. This electrical signal is conducted up the cable to the first time delay element 26 in the group 12. The electrical signal is delayed for a time equal to the time for the sound signal to travel upward to the second lowest of the hydrophones 24. There, the sound signal is detected by the second lowest of the hydrophones which also generates an electrical signal representative of the sound signal. This electrical signal is added to the delayed electrical signal from the first hydrophone, and so on up the hydrophone group 12.

Figure 2:
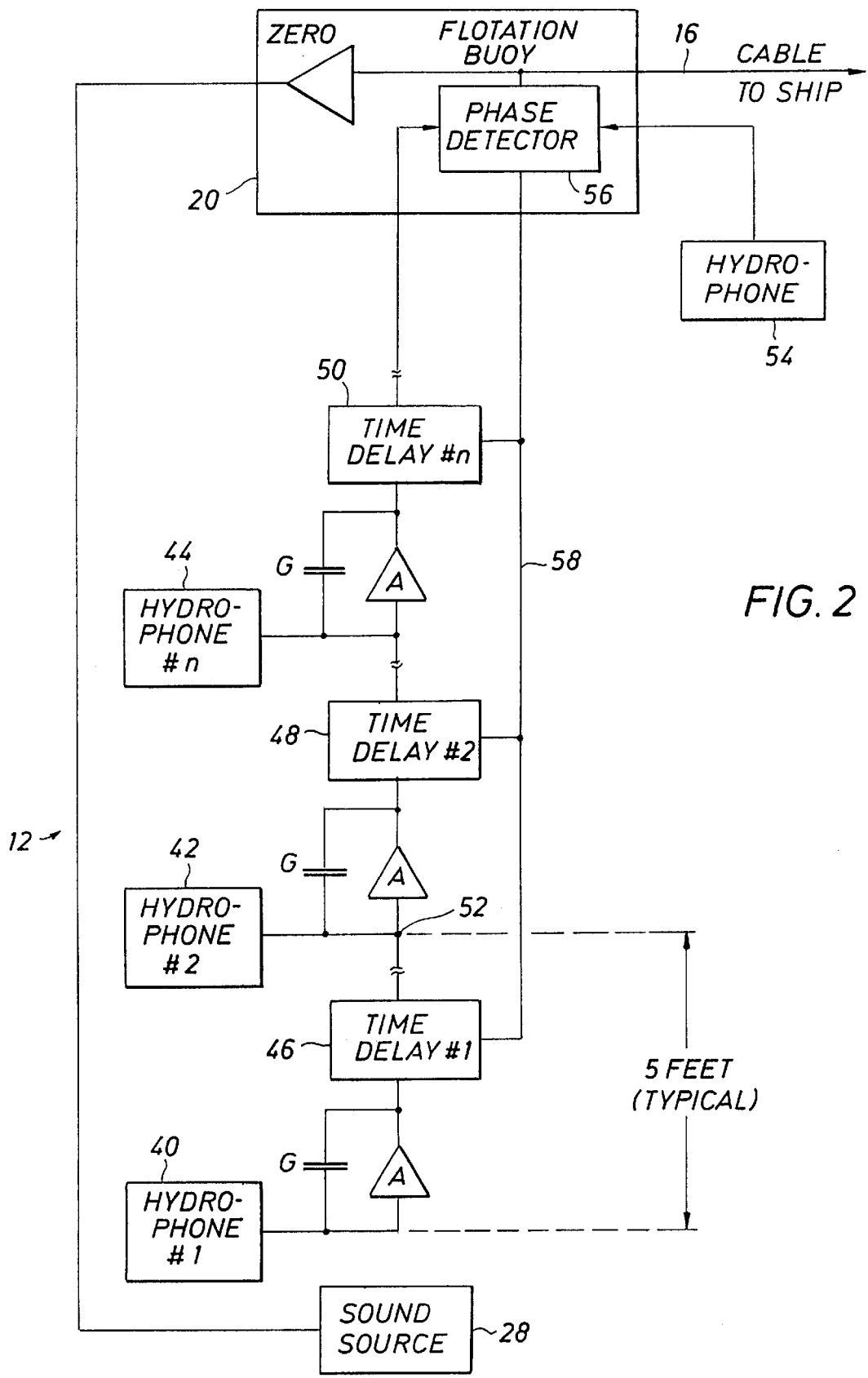
FIG. 2 is an electrical schematic diagram of one antenna of the vertical array.

This aspect of the present invention is shown in greater detail in FIG. 2. FIG. 2 depicts one hydrophone group 12, which includes a plurality of hydrophones, shown in FIG. 2 as hydrophone #1, labeled 40; hydrophone #2, labeled 42; and so on through hydrophone #n, labeled 44. Each hydrophone group 12 may include 100 hydrophones, for example, each typically separated by 5 feet along the cable 22, to a depth of 500 feet. The separation of 5 feet is conveniently selected because sound travels roughly as about 5000 feet per second in sea water, and thus a time delay of 1 millisecond in each time delay element 26 approximately synchronizes the sound and electrical signals up along the hydrophone group. As described below, the time delay is dynamically adjustable to make this synchronization more precise.

Each hydrophone 24, such as hydrophone 40, is provided with a unity gain operational amplifier A, each of which has a feedback capacitor G. The amplifiers A and feedback capacitors G are provided in the signal path for the detected signal so that each hydrophone 24 in the group contributes to the composite or summed signal equally, owing to differences in hydrophone sensitivities. The signal from hydrophone #1, through its associated amp A is fed to a time delay element #1, labeled 46. The time delay element #1, after the appropriate time delay of about 1 millisecond, outputs the signal to a node 52, which is also the output of hydrophone #2. The output of time delay element #1 and the output of hydrophone #2 and added, and input to the amp associated with hydrophone #2. This summed signal is then provided to the input of time delay #2, and so on up the cable 22.

To precisely synchronize the electrical and sound signals, the time delay elements are dynamically adjustable. A test hydrophone 54, located at the surface with the flotation device 20, receives sound signals apart from the hydrophone group 12. The electrical output of the hydrophone 54 is provided as one input into a phase detector 56. The phase detector 56 also receives an input from the top-most time delay element #n. A comparison of the phase of the signals from the hydrophone 54 and the delay element # n determines if a dynamic adjustment is needed in the time delays of the delay elements 26. This is accomplished with a typical time delay circuit, shown in greater detail in FIG. 3.

Figure 3:
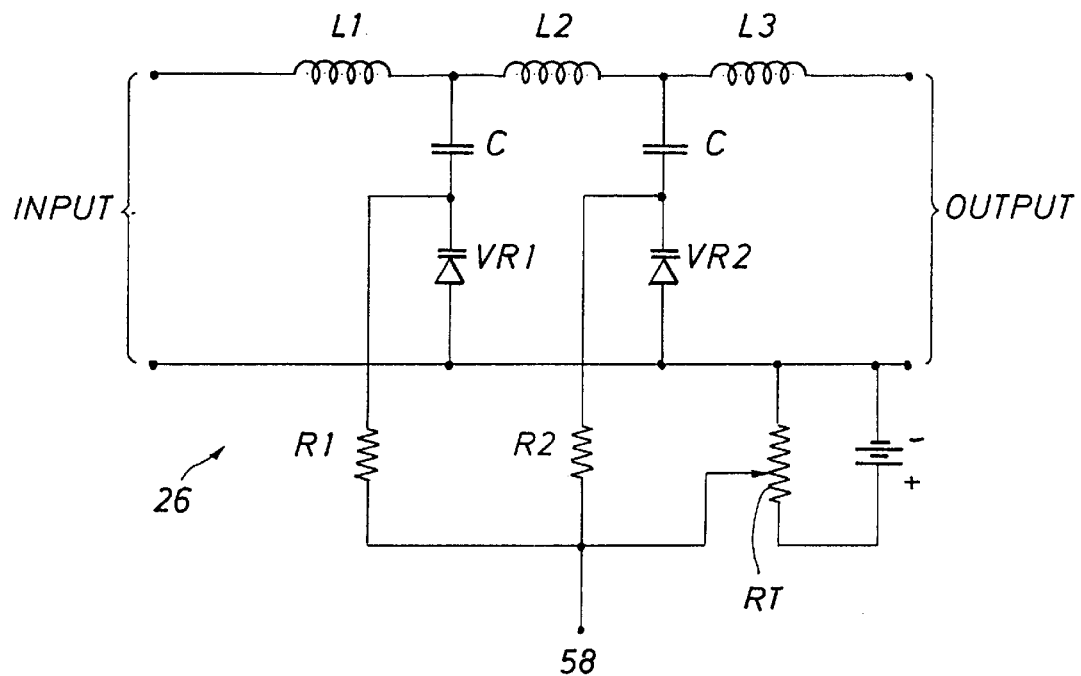
FIG. 3 is an electrical schematic diagram of a tunable time delay element located periodically along one antenna of such an array.

The time delay element comprises a low pass filter of commonly used circuit elements, shown scematically in FIG. 3. These include inductors or chokes $L_1$, $L_2$, and $L_3$, isolating resistors $R_1$ and $R_2$, capacitors C, and varactor diodes $VR_1$ and $VR_2$. The inductors and varactor diodes are selected for the desired time delay, which is adjusted by a variable tuning resistor $R_T$. The value set by the tuning resistor $R_T$ determines the Q point of the varactor diodes $VR_1$ and $VR_2$, and thus the delay in the time delay element 26.

It should be understood that FIG. 3 represents a schematic of the time delay of this invention. In practice, the function of the variable tuning resistor will be carried out by the output of the phase detector 56.

Operation of the Vertical Hydrophone Array

Figure 4:
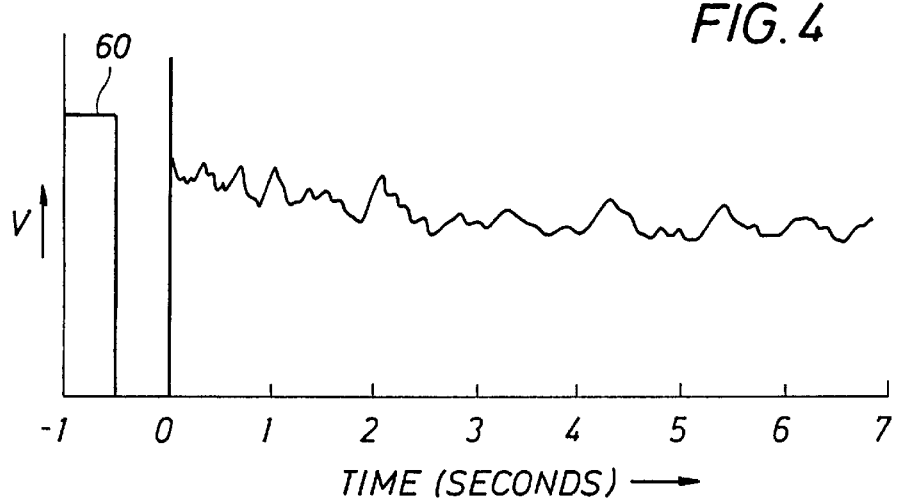
FIG. 4 is a trace of a seismic signal as received along a vertical antenna.

FIG. 4 provides a time plot of a seismic signal during data acquisition. At some period before a seismic shot is made, a time period 60 is provided for automatic adjustment and tuning of the array circuitry. This is a calibration pulse from the signal source on the array of about 1/10 second, or about 10–20 cycles, enough to allow the transducer to stabilize. At the top of the cable 22, the hydrophone 54 detects this sound. The sound from the bottom transducer will be picked up by the surface hydrophone and provided to a receiver.

At time t=0, a shot from a seismic signal source such as an air gun (not shown), is fired, and the sound signal propagates as mentioned above. When a seismic shot is made, there is an interval of 7–8 seconds between shots, waiting for reflections to return, as shown in FIG. 4. Then another shot is fired.

The signal through the plurality of hydrophones on the cable is also received by the system at the top of the hydrophone array at the receiver. The phase of the two signals is compared by the phase detector 56. The phase difference is then converted to a corrective delay, which is signaled to the array delay elements 26. The phase will be the same when the velocity of sound in the water is the same as the velocity of the electrical signal in the array with the delay elements.

If the phase difference between the two is greater than 180°, it can still bring them in with no ambiguity. The phase detector provides a maximum for more than 180°, then subtracts increments of half cycles until the phase difference is less than 180°, then a fractional correction is provided to each of the delay elements.

The composite signal from each of the hydrophone groups 12 is collected and transmitted along the tow cable 16 to a central receiver on the vessel 14 in the conventional manner. This data, as the result of the enhanced signal to noise ratio of the hydrophone array, is capable of imaging far deeper subsea structures than have been observed heretofore.

Structure of the Vertical Hydrophone Array to Account for Variations in the Speed of Sound Through the Water Temperature varies non-linearly with the depth of the water in the ocean. At some unknown depth below the surface, the temperature of the water changes radically, in what is referred to as a "thermocline". Since sound travels more rapidly in colder water, the thermocline can radially alter the speed at which sound travels up the hydrophone antenna of this invention. This phenomenon is accounted for by the preferred embodiment of FIG. 5.

Figure 5A:
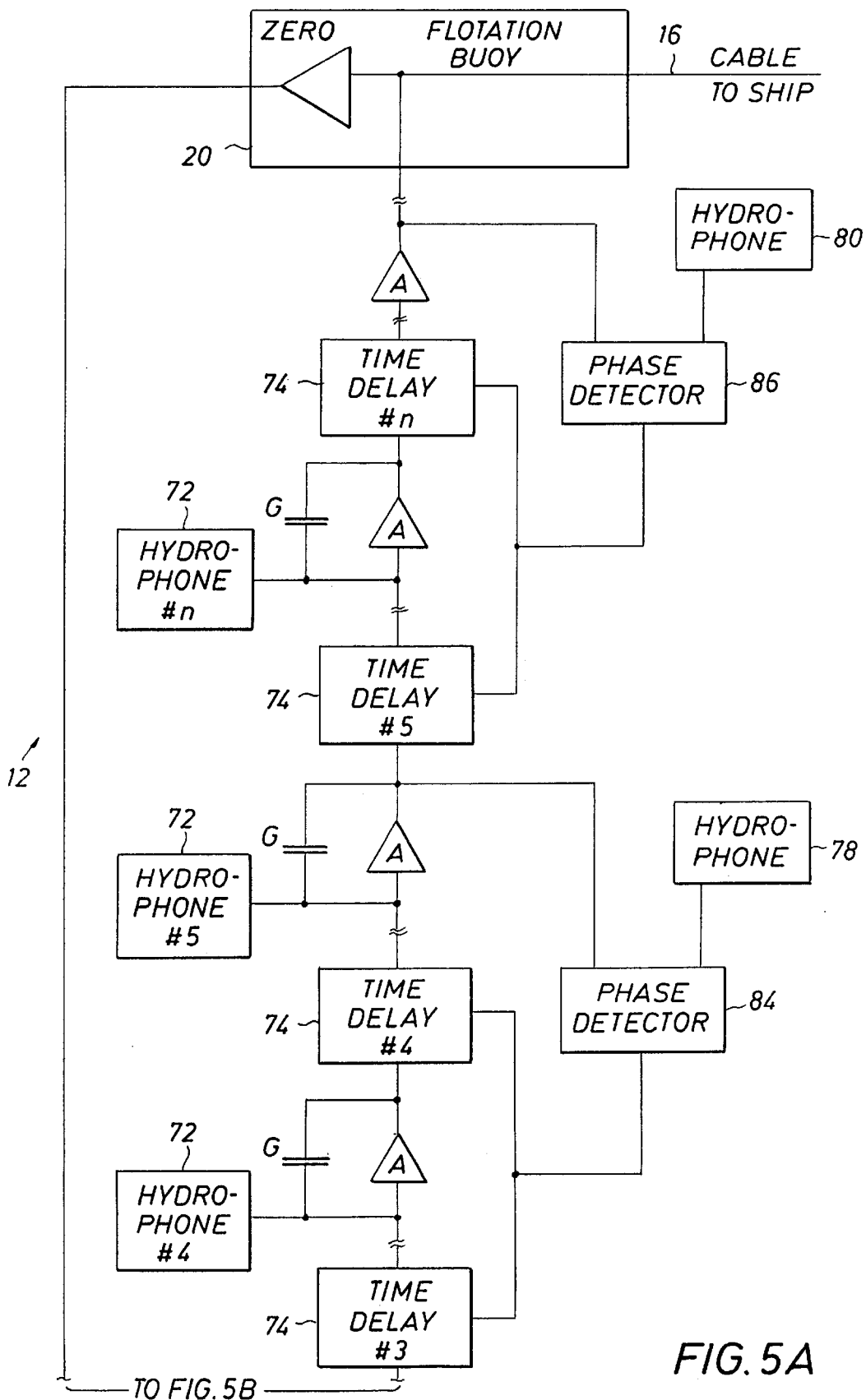
FIG. 5 is an electrical schematic diagram of an antenna of the vertical array, segmented into a plurality of segments to accommodate variations in the speed of sound signals from the bottom to the top of the antenna.
Figure 5B:
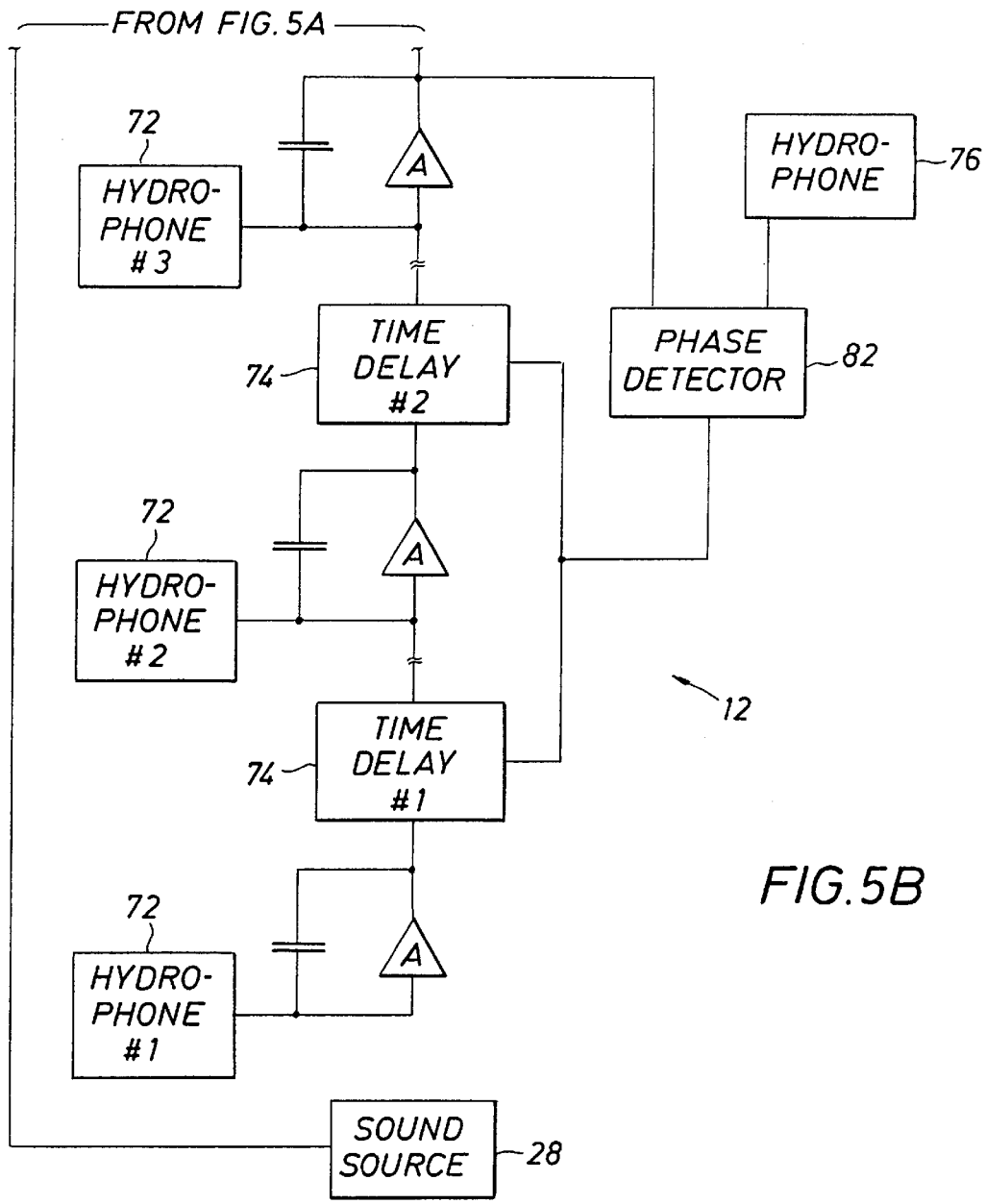

The structure of the vertical hydrophone array of FIG. 5, includes a flotation buoy 70 and a hydrophone group 12. The hydrophone group includes a plurality of hydrophones 72, numbered 1 through n, each with an associated time delay 74, also numbered 1 through 5. This structure further includes a set of hydrophones 76, 78, and 80, each with an associated phase detector 82, 84, and 86, respectively. Each of the phase dectectors 82, 84, and 86 is coupled between a pair of time delays 74. In FIG. 5, the phase detectors are shown as coupled to contiguous time delays, but they may be coupled to time delays which are separated by other time delays.

Figure 6:
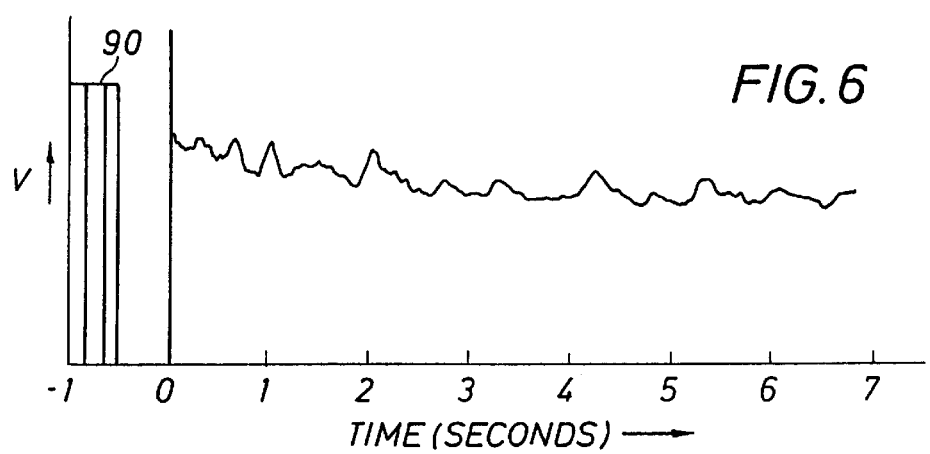
FIG. 6 is is a trace of a seismic signal as received along a vertical antenna of FIG. 5.

FIG. 6 depicts a time plot of a seismic signal during data acquisition for the array of FIG. 5. As with FIG. 4, at some period before a seismic shot is made, a time period 90 is provided for automatic adjustment and tuning of the array circuitry, with a discrete sound pulse from the sound source 28 for each segment of the array. It should also be understood that the sound source signal, as depicted in FIG. 4, could also be used in this embodiment. However, using discrete sound pulses, which may also be at different frequencies, provides distinct signals for tuning the segments of the antenna.

As the sound signal travels up the antenna, it will be received by each of the hydrophone 76, 78 and 80, in sequential order, and also by each of the hydrophones 72, from 1 to n sequentially. Through colder water, the time duration between sequential hydrophones will be less, and the phase detectors 82, 84, and 86 will therefore modify the duration of the time delay in each of the time delays 74 to maintain synchronism between the electronic and sound signals traveling up the antenna.

The principles, preferred embodiment, and mode of operation of the present invention have been described in the foregoing specification. This invention is not to be construed as limited to the particular forms disclosed, since these are regarded as illustrative rather than restrictive. Moreover, variations and changes may be made by those skilled in the art without departing from the spirit of the invention.

We claim:

1. A vertical hydrophone cable comprising:
   a. a support cable,
   b. a plurality of hydrophones spaced apart along the cable, and
   c. a plurality of electrical signal delay elements spaced apart along the cable, wherein each of the plurality of delay elements provides a time delay such that an electrical signal conducted along the support cable travels at the same speed as a sound signal travels in water.

2. The cable of claim 1 further comprising a flotation device at an end of the cable.

3. The cable of claim 2 further comprising means for dynamically altering the time delay of each delay element.

4. The cable of claim 3, wherein the means for altering the time delay of each delay element includes a phase detector.

5. The cable of claim 4 further comprising a calibration hydrophone to provide a calibration signal to the phase detector.

6. The cable of claim 1 further comprising an operational amplifier in the support cable for each of the plurality of hydrophones.

7. An array of vertical-cable hydrophone groups, the array comprising a plurality of vertical hydrophone cables, each of the vertical hydrophone cable comprising:
   a. a support cable,
   b. a plurality of hydrophones spaced apart along the cable, and
   c. a plurality of electrical signal delay elements spaced apart along the cable, wherein each of the plurality of delay elements provides a time delay such that an electrical signal conducted along the support cable travels at the same speed as a sound signal travels in water.

8. The array of claim 7 further comprising a flotation device at an end of each support cable.

9. The cable of claim 8 further comprising means for dynamically altering the time delay of each delay element.

10. The cable of claim 9, wherein the means for altering the time delay of each delay element includes a phase detector.

11. The cable of claim 10 further comprising a calibration hydrophone to provide a calibration signal to the phase detector.

12. The cable of claim 7 further comprising an operational amplifier in each support cable, with an operational amplifier for each of the plurality of hydrophones.

13. A method of seismic exploration comprising the steps of:
   a. deploying a plurality of vertical hydrophone cables, each of the cables comprising:
      i. a support cable, ii. a plurality of hydrophones spaced apart along the cable, and iii. a plurality of electrical signal delay elements spaced apart along the cable, wherein each of the plurality of delay elements provides a time delay such that an electrical signal conducted along the support cable travels at the same speed as a sound signal travels in water, b. generating a seismic signal, and c. receiving reflected return sound signals at the plurality of hydrophones, each of the hydrophones generating an electrical signal in response to the received reflected return sound signals in synchronism with the reflected return sound signals.

14. A vertical hydrophone array comprising:

a. a support cable, b. a plurality of hydrophones spaced apart along the cable, c. a flotation device configured to float on the surface of a body of water and support the support cable beneath it in a vertical orientation, and d. a plurality of electrical signal delay elements spaced apart along the cable with one of the plurality of delay elements for each of the plurality of hydrophones, wherein each of the plurality of delay elements provides a time delay such that an electrical signal conducted along the support cable travels at the same speed as a sound signal travels in water.

15. The cable of claim 14 further comprising means for dynamically altering the time delay of each delay element.

16. The cable of claim 3, wherein the means for altering the time delay of each delay element includes a phase detector.

17. The cable of claim 4 further comprising a calibration hydrophone to provide a calibration signal to the phase detector.

18. A vertical hydrophone cable comprising:

a. a support cable, b. a plurality of hydrophones spaced apart along the cable, c. a plurality of electrical signal delay elements spaced apart along the cable, wherein each of the plurality of delay elements provides a time delay such that an electrical signal conducted along the support cable travels at the same speed as a sound signal travels in water; and d. a plurality of phase detectors coupled between selected respective pairs of the delay elements to dynamically alter the delay characteristics of the delay elements, and wherein one of the plurality of phase detectors may alter the delay characteristics of its respective delay element in a manner different than another of the plurality of phase detectors.

19. The cable of claim 18, further comprising a flotation device configured to float on the surface of a body of water and to support one end of the support cable.

* * * * *